US008861617B2

(12) United States Patent
Chen et al.

(10) Patent No.: US 8,861,617 B2
(45) Date of Patent: Oct. 14, 2014

(54) METHOD AND APPARATUS OF REGION-BASED ADAPTIVE LOOP FILTERING

(75) Inventors: Ching-Yeh Chen, Taipei (TW); Chih-Ming Fu, Hsinchu (TW); Chia-Yang Tsai, New Taipei (TW); Yu-Wen Huang, Taipei (TW); Shaw-Min Lei, Hsinchu (TW)

(73) Assignee: Mediatek Inc, Hsinchu (TW)

( * ) Notice: Subject to any disclaimer, the term of this patent is extended or adjusted under 35 U.S.C. 154(b) by 313 days.

(21) Appl. No.: 13/177,343

(22) Filed: Jul. 6, 2011

(65) Prior Publication Data

US 2012/0082244 A1 Apr. 5, 2012

Related U.S. Application Data

(60) Provisional application No. 61/390,068, filed on Oct. 5, 2010, provisional application No. 61/421,729, filed (Continued)

(51) Int. Cl.
*H04N 7/26* (2006.01)
*H04N 19/82* (2014.01)

(Continued)

(52) U.S. Cl.
CPC ... *H04N 19/00103* (2013.01); *H04N 19/00896* (2013.01); *H04N 19/0026* (2013.01); *H04N 19/00066* (2013.01); *H04N 19/00175* (2013.01)
USPC ............ 375/240.29; 375/240.01; 375/240.02; 375/240.12; 375/240.16; 375/240.24; 375/240.25; 375/240.26

(58) Field of Classification Search
USPC ............ 375/240.24, 240.26, 240.29, 240.01, 375/240.02, 240.12, 240.16, 240.25
See application file for complete search history.

(56) References Cited

U.S. PATENT DOCUMENTS 5,446,806 A 8/1995 Ran et al.
5,859,979 A 1/1999 Tung et al.

(Continued)

FOREIGN PATENT DOCUMENTS

WO WO 2011087932 A1 * 7/2011
WO WO 2011127961 A1 * 10/2011

OTHER PUBLICATIONS

"(Video coding technology proposal by Qualcomm Inc.", by Karczewicz et al., Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A121.

(Continued)

*Primary Examiner* — Christopher S Kelley
*Assistant Examiner* — Zhihan Zhou
(74) *Attorney, Agent, or Firm* — Blairtech Solution LLC (57) ABSTRACT

In a block-based motion compensated system, coding noises may arise due to lossy operations. Adaptive loop filter (ALF) is a technique used to improve the quality. A pixel adaptive (PA) ALF method was developed that uses the Sum-modified Laplacian Measure (SLM) to classify pixels and applies a respective ALF filter to each pixel according to the SLM. While the PA ALF achieves better performance over a conventional single filter (SF) based ALF, the PA ALF causes higher complexity and consumes more power due to the high complexity and per-pixel filter switching. Accordingly region based ALF scheme is disclosed which allows adaptive filter selection on a region by region basis and does not require per-pixel filter switching. In one embodiment according to the present invention, a picture is divided into M×N regions. The region based ALF also allows region merging for the M×N regions to improve performance. In another aspect of the present invention, the optimal ALF design also takes into consideration of the system complexity by using rate-distortion-complexity optimization (RDCO). The RDCO technique is also applied to sample adaptive offset (SAO) design.

13 Claims, 6 Drawing Sheets

Related U.S. Application Data on Dec. 10, 2010, provisional application No. 61/436,737, filed on Jan. 27, 2011, provisional application No. 61/454,829, filed on Mar. 21, 2011, provisional application No. 61/392,162, filed on Oct. 12, 2010, provisional application No. 61/440,501, filed on Feb. 8, 2011.

(51) Int. Cl.
*H04N 19/17* (2014.01)
*H04N 19/117* (2014.01)
*H04N 19/147* (2014.01)
*H04N 19/127* (2014.01)

(56) References Cited

U.S. PATENT DOCUMENTS

| | | |
|---|---|---|
| 8,660,174 B2 | 2/2014 | Fu et al. |
| 2005/0129122 A1 | 6/2005 | Booth et al. |
| 2008/0008394 A1 | 1/2008 | Segall |
| 2008/0212678 A1 | 9/2008 | Booth et al. |
| 2008/0240252 A1 | 10/2008 | He |
| 2009/0010330 A1 | 1/2009 | Tourapis et al. |
| 2009/0067505 A1 | 3/2009 | Tourapis et al. |
| 2009/0086816 A1 | 4/2009 | Leontaris et al. |
| 2009/0087111 A1 | 4/2009 | Noda et al. |
| 2009/0141814 A1 | 6/2009 | Yin et al. |
| 2009/0196342 A1 | 8/2009 | Divorra et al. |
| 2011/0026600 A1* | 2/2011 | Kenji ............ 375/240.24 |
| 2011/0243249 A1* | 10/2011 | Lee et al. ......... 375/240.25 |
| 2013/0016768 A1* | 1/2013 | Lin et al. ......... 375/240.02 |
| 2013/0034159 A1* | 2/2013 | Siekmann et al. ... 375/240.12 |
| 2013/0142262 A1* | 6/2013 | Ye et al. .......... 375/240.16 |
| 2013/0259117 A1 | 10/2013 | Fu et al. |

OTHER PUBLICATIONS

"CE8 Subtest 2: Block based adaptive loop filter (ALF)", by Chong et al., Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E323.

International Search Report, PCT/CN2011/080408, mailing date Dec. 22, 2011.

* cited by examiner

| alf_param( ) { | C | Descriptor |
|---|---|---|
|   alf_flag | 2 | u(1)\|ac(v) |
|   if( alf_flag ) { | | |
|     region_adaptation_flag | 2 | u(1)\|ae(v) |
|     … // original ALF parameters for luma | | |
|     alf_chroma_idc | 2 | u(2)\|ae(v) |
|     … // original ALF parameters for chroma and luma CU on/off control | | |
|   } | | |
| } | | |

*Fig. 4*

| 0 | 1 | 4 | 5 |
|---|---|---|---|
| 15 | 2 | 3 | 6 |
| 14 | 11 | 10 | 7 |
| 13 | 12 | 9 | 8 |

| 0 | 1 | 2 | 3 |
|---|---|---|---|
| 7 | 6 | 5 | 4 |
| 8 | 9 | 10 | 11 |
| 15 | 14 | 13 | 12 |

| 0 | 7 | 8 | 15 |
|---|---|---|---|
| 1 | 6 | 9 | 14 |
| 2 | 5 | 10 | 13 |
| 3 | 4 | 11 | 12 |

*Fig. 7*

| 0 | 1 | 5 | 6 |
|---|---|---|---|
| 2 | 4 | 7 | 12 |
| 3 | 8 | 11 | 13 |
| 9 | 10 | 14 | 15 |

*Fig. 8*

| 0 | 1 | 2 | 3 |
|---|---|---|---|
| 11 | 12 | 13 | 4 |
| 10 | 15 | 14 | 5 |
| 9 | 8 | 7 | 6 |

*Fig. 9*

| 0 | 1 | 4 | 5 |
|---|---|---|---|
| 2 | 3 | 6 | 7 |
| 8 | 9 | 12 | 13 |
| 10 | 11 | 14 | 15 |

*Fig. 10*

| 0 | 1 | 2 | 3 |
|---|---|---|---|
| 4 | 5 | 6 | 7 |
| 8 | 9 | 10 | 11 |
| 12 | 13 | 14 | 15 |

| alf_fs_selection_param( r, c ) { | C | Descriptor |
|---|---|---|
|   if( c = = 0 && r = = 0 ) { | | |
|     AlfFuFilterSetIdx[ r ][ c ] = 0 | | |
|   } else { | | |
|     if( alf_enable_fu_merge ) { | | |
|       if ( c = = 0 ) { | | |
|         if( alf_merge_flag ) | 2 | u(1)\|ae(v) |
|           AlfFuFilterSetIdx[ r ][ c ] = AlfFuFilterSetIdx[ r – 1 ][ c ] | | |
|         else if ( AlfFsNum > 1 ) | | |
|           AlfFuFilterSetIdx[ r ][ c ] = alf_fu_filter_set_idx | 2 | u(v)\|ae(v) |
|         else | | |
|           AlfFuFilterSetIdx [ r ][ c ] = 0 | | |
|       } else if ( r = = 0 ) { | | |
|         if( alf_merge_flag ) | 2 | u(1)\|ae(v) |
|           AlfFuFilterSetIdx[ r ][ c ] = AlfFuFilterSetIdx[ r ][ c – 1 ] | | |
|         else if ( AlfFsNum > 1 ) | | |
|           AlfFuFilterSetIdx[ r ][ c ] = alf_fu_filter_set_idx | 2 | u(v)\|ae(v) |
|         else | | |
|           AlfFuFilterSetIdx [ r ][ c ] = 0 | | |
|       } else { | | |
|         if( alf_merge_flag ) { | 2 | u(1)\|ae(v) |
|           if( AlfFuFilterSetIdx[ r–1 ][ c ] = = AlfFuFilterSetIdx[ r ][ c–1 ] ){ | | |
|             AlfFuFilterSetIdx[ r ][ c ] = AlfFuFilterSetIdx[ r ][ c – 1 ] | | |
|           } else { | | |
|             if( alf_merge_up_flag ) | 2 | u(1)\|ae(v) |
|               AlfFuFilterSetIdx[ r ][ c ] = AlfFuFilterSetIdx[ r – 1 ][ c ] | | |
|             else | | |
|               AlfFuFilterSetIdx[ r ][ c ] = AlfFuFilterSetIdx[ r ][ c – 1 ] | | |
|           } | | |
|         } else { | | |
|           if ( AlfFsNum > 1 ) | | |
|             AlfFuFilterSetIdx[ r ][ c ] = alf_fu_filter_set_idx | 2 | u(v)\|ae(v) |
|           else | | |
|             AlfFuFilterSetIdx[ r ][ c ] = 0 | | |
|         } | | |
|       } | | |

*Fig. 14*

METHOD AND APPARATUS OF REGION-BASED ADAPTIVE LOOP FILTERING

CROSS REFERENCE TO RELATED APPLICATIONS

The present invention claims priority to U.S. Provisional Patent Application, Ser. No. 61/390,068, filed Oct. 5, 2010, entitled "Improved In-Loop Filter", U.S. Provisional Patent Application, Ser. No. 61/392,162, filed Oct. 12, 2010, entitled "Improved In-Loop Filter", U.S. Provisional Patent Application, Ser. No. 61/421,729, filed Dec. 10, 2010, entitled "Rate-Distortion-Complexity Optimization for Adaptive Loop Filter", U.S. Provisional Patent Application, Ser. No. 61/436,737, filed Jan. 27, 2011, entitled "Filter Pattern Adaptation", U.S. Provisional Patent Application, Ser. No. 61/440,501, filed Feb. 8, 2011, entitled "Pixel Classification for ALF", U.S. Provisional Patent Application, Ser. No. 61/454,829, filed Mar. 21, 2011, entitled "Region-based ALF". The present invention is also related to U.S. patent application, Ser. No. 13/093,068, filed on Mar. 25, 2011, entitled "Method and Apparatus of Adaptive Loop Filtering" and U.S. patent application, Ser. No. 13/158,427, filed on Jun. 12, 2011, entitled "Apparatus and Method of Sample Adaptive Offset for Video Coding". The U.S. Provisional Patent Applications and the U.S. Patent Applications are hereby incorporated by reference in their entireties.

FIELD OF THE INVENTION

The present invention relates to video coding. In particular, the present invention relates to adaptive loop filtering.

BACKGROUND

Motion compensated inter-frame coding has been widely adopted in various coding standards, such as MPEG-1/2/4 and H.261/H.263/H.264/AVC. Motion estimation and compensation as well as subsequent processing are performed on a block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system under development. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation. In the recent HEVC development, adaptive loop filtering (ALF) is being adopted to process deblocked reconstruction frames. Adaptive loop filtering is used as in-loop processing in addition to deblocking and is often applied after deblocking of reconstructed video data.

The conventional adaptive loop filter is only applied to these blocks where the filtering helps to improve performance. For other blocks that adaptive loop filtering does not help to improve performance, adaptive loop filtering is not applied. When the ALF is applied, a single filter SF is applied to the blocks in a slice. The single filter is selected from a group of filter candidates to achieve the best performance, such as minimum distortion, minimum rate or best R-D performance. Such ALF scheme is referred to as SF (single filter) ALF. Another ALF scheme (called QC_ALF) was proposed by Qualcomm ("Video coding technology proposal by Qualcomm Inc.", Karczewicz et al., Joint Collaborative Team on Video Coding (JCT-VC) of ITU-T SG16 WP3 and ISO/IEC JTC1/SC29/WG11, 1st Meeting: Dresden, D E, 15-23 Apr., 2010, Document: JCTVC-A121. According to QC_ALF, the ALF is applied to the deblocked video data on a block by block basis. For each block, the Sum-modified Laplacian Measure (SLM) SLM(i,j) of each pixel (i,j) of the block is computed. Each pixel of the block is then classified into multiple classes or categories according to the SLM measurement, and a respective ALF filter is selected for each pixel. While the QC_ALF scheme may improve performance over the SF ALF, the SLM computations for each pixel and filter switching from pixel to pixel will result in higher computational complexity and consume more power. It is desirable to develop an ALF scheme that provides the advantage of multiple filter choices for each region without high computational complexity and the need to switch filter from pixel to pixel.

During the ALF design in terms of region partition and mode decision, an optimization technique, called rate-distortion optimization (RDO), is often used to guide the region partition and mode decision. While the RDO technique achieves the best rate-distortion performance, it does not take into consideration of the system complexity, which may consume valuable system resources. It is desirable to use an optimization scheme that achieves the best performance in terms of rate, distortion, and complexity. Accordingly, the rate-distortion-complexity optimization (RDCO) technique is used for ALF design. The RDCO technique is also applied to sample adaptive offset (SAO) design to achieve the best rate-distortion-complexity performance.

BRIEF SUMMARY OF THE INVENTION

A method and apparatus for processing of coded video using adaptive loop filter are disclosed. In one embodiment according to the present invention, the method and apparatus for processing of coded video using adaptive loop filter comprise steps of receiving reconstructed video data corresponding to coded video data from a processing unit, applying adaptive loop filtering to the reconstructed video data to generate filtered video data, and providing the filtered video data. The adaptive loop filtering may be region based ALF or non-region based ALF according to a region adaptation flag. If the region based ALF is selected, the reconstructed video data can be divided into M×N regions, where M and N are integers. Regions of the M×N regions may be merged using either 1-D or 2-D syntax. Furthermore, a merge flag may be used to indicate whether a region is merged with one or more neighboring regions. When 1-D syntax is used, a scanning pattern may be used to assign a group index to each of the M×N regions, wherein the scanning pattern is selected from a group consisting of deformation of Hilbert curve, horizontal snake scan, vertical snake scan, zig-zag scan, spiral scan, quad-tree scan, and raster scan. In another embodiment according to the present invention, each of the M×N regions is aligned with boundaries of largest coding units (LCUs). In yet another embodiment according to the present invention, a merge flag is used to indicate whether region merging is allowed or not.

A method and apparatus for adaptive loop filter (ALF) design or sample adaptive offset (SAO) design are disclosed. In one embodiment according to the present invention, the method and apparatus for adaptive loop filter (ALF) design or sample adaptive offset (SAO) design comprise steps of determining candidates associated with a design feature for adaptive loop filter (ALF) design or sample adaptive offset (SAO) design and selecting a best candidate among the candidates according to rate-distortion-complexity optimization (RDCO). The design feature can be associated with mode decision or region partition. For the ALF design, the complexity of the RDCO is related to the number of filter coefficients, a combination of the number of filter coefficients and the number of pixels to be filtered, or a combination of the number of filter coefficients, the number of pixels to be filtered and the number of operations associated with a candidate mode for mode decision. For the SAO design, the complexity of the RDCO can be related to the number of operations associated with a pixel classification type or a combination of the number of operations associated with a pixel classification type and the number of pixels to be compensated with an offset value.

DETAILED DESCRIPTION OF THE INVENTION

For digital video compression, motion compensated inter-frame coding is an effective compression technique and has been widely adopted in various coding standards, such as MPEG-1/2/4 and H.261/H.263/H.264/AVC. In a motion compensated system, motion estimation/compensation and subsequent compression is often performed on a block by block basis. During compression process, coding noises may arise due to lossy operations applied such as quantization. The coding artifacts may become noticeable in the reconstructed video data, especially at or near block boundaries. In order to alleviate the visibility of coding artifacts, a technique called deblocking has been used in newer coding systems such as H.264/AVC and the High Efficiency Video Coding (HEVC) system under development. The deblocking process applies filtering across block boundaries adaptively to smooth the large transitions at and near block boundaries due to coding noises while retaining image sharpness. Furthermore, due to the nature of inter-frame coding, the deblocking process is configured for in-loop operation.

In HEVC, another in-loop filtering, called adaptive loop filtering (ALF), is used in addition to deblocking. While deblocking filter is only applied to block boundaries, the adaptive loop filter may be applied to all pixels in a frame, field, slice or picture area. The conventional adaptive loop filter is only applied to these blocks where the filtering helps to improve performance. For other blocks that adaptive loop filtering does not help to improve performance, adaptive loop filtering is not applied. When the ALF is applied, a single filter SF is applied to the blocks in a slice. The single filter is selected from a group of filter candidates to achieve the best performance (such as minimum distortion, minimum rate or best R-D performance. Such ALF scheme is referred to as SF (single filter) ALF. Information associated with the filter selected has to be conveyed to the decoder side. In order to conserve the information to be transmitted or stored, the set of ALF filters may be pre-defined and the filter selection can be indicated by an index. Alternatively, the filter can be derived in a time-delayed arrangement based on video data already reconstructed. Therefore, no side information or very little side information is needed. Other means for reducing information associated with the filter can be used such as entropy coding of the filter coefficients and/or transmitting the coefficients differentially.

Figure 1:
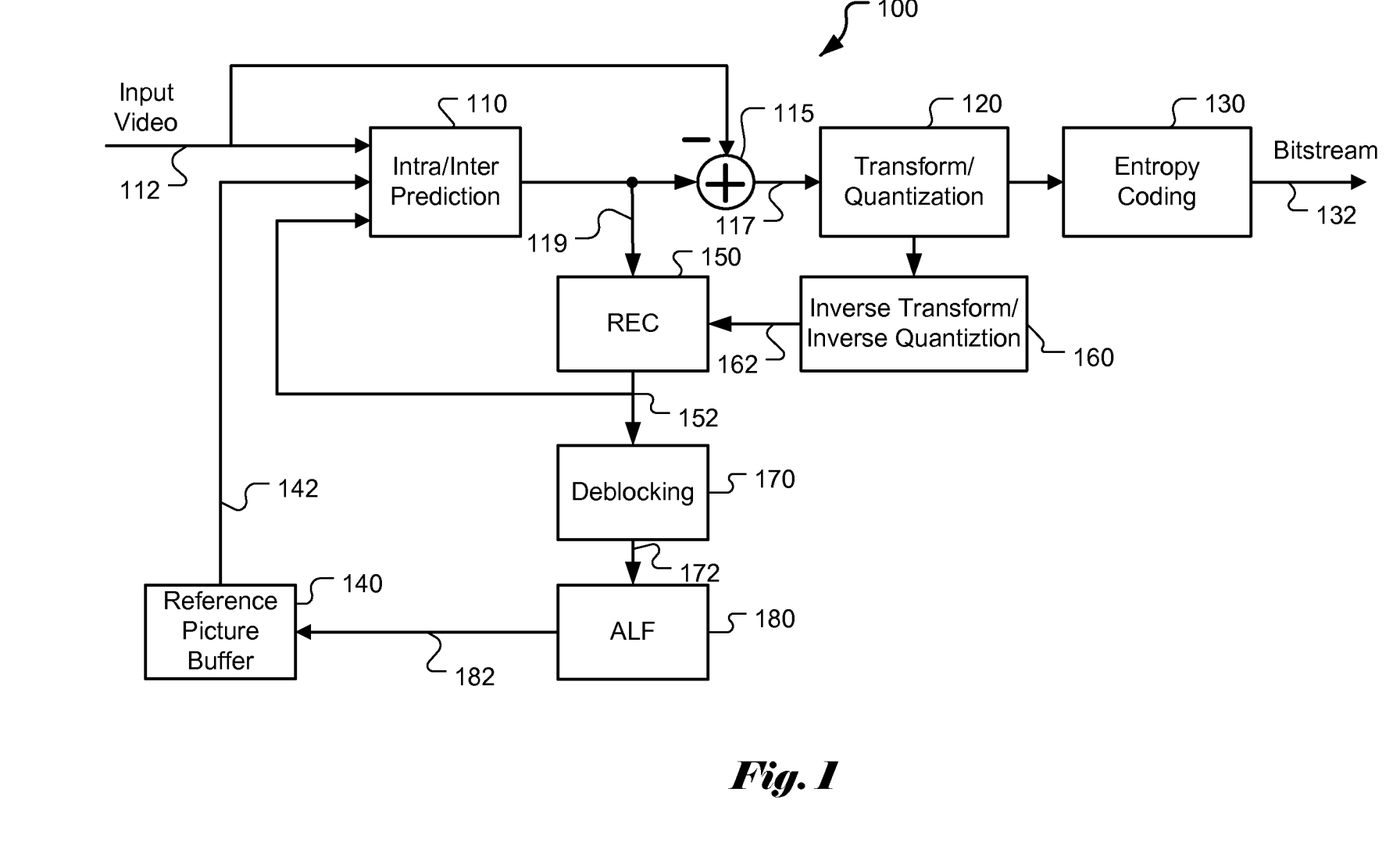
FIG. 1 illustrates an exemplary block diagram of a video coding system based on motion compensated prediction, where adaptive loop filter is applied to reconstructed video data.

A system block diagram for a coding system incorporating adaptive loop filtering and deblocking is shown in FIG. 1. FIG. 1 illustrates a system block diagram 100 of motion-compensated video encoder with deblocking. Compression system 100 illustrates a typical video encoder incorporating Intra/Inter-prediction, Discrete Cosine Transform (DCT) and entropy coding to generate compressed video data. The input video data enters the encoder through input interface 112 and the input video data is predicted using Intra/Inter-prediction 110. In the Intra prediction mode, the incoming video data are predicted by surrounding data in the same frame picture or field picture that are already coded. In the Inter prediction mode, the prediction is based on previously reconstructed data 142 in the temporal direction where the reconstructed data 142 are stored in picture buffer 140. The Inter prediction can be a list 0 prediction mode, where the prediction is based on a picture that is prior to the current picture in decoding order and is in a first list of reference pictures. The Inter prediction may also be a list 1 prediction mode where the Inter prediction is based on a picture that is prior to the current picture in the decoding order and is in a second list of reference picture if the current slice is a B-slice. The Inter prediction may also be a bi-prediction mode where the Inter prediction is based on a list 0 reference picture and a list 1 reference picture if the current slice is a B-slice. In the Inter-prediction mode, the Intra/Inter prediction 110 will cause the prediction data to be provided to the adder 115 and be subtracted from the original video data 112. The output 117 from the adder 115 is termed as the prediction error which is further processed by the DCT/Q block 120 representing Discrete Cosine Transform and quantization (Q). The DCT and quantization 120 converts prediction errors 117 into coded symbols for further processing by entropy coding 130 to produce compressed bitstream 132, which is stored or transmitted. In order to provide the prediction data for Intra/Inter prediction, the prediction error processed by the DCT and quantization 120 has to be recovered by inverse DCT and inverse quantization (IDCT/IQ) 160 to provide a reconstructed prediction error 162. In the Inter prediction mode, the reconstructed prediction error 162 is added to previously reconstructed video data 119 by the reconstruction block 150 to form a currently reconstructed frame 152. In the Intra prediction mode, the reconstructed prediction error 162 is added to the previously reconstructed surrounding data in the same picture. The Intra/Inter prediction block 110 is configured to route the previously reconstructed data 119 to the reconstruction block 150, where the reconstructed data 119 may correspond to a previously reconstructed frame in the temporal direction or reconstructed surrounding data in the same picture depending on the Inter/Intra mode.

Figure 2:
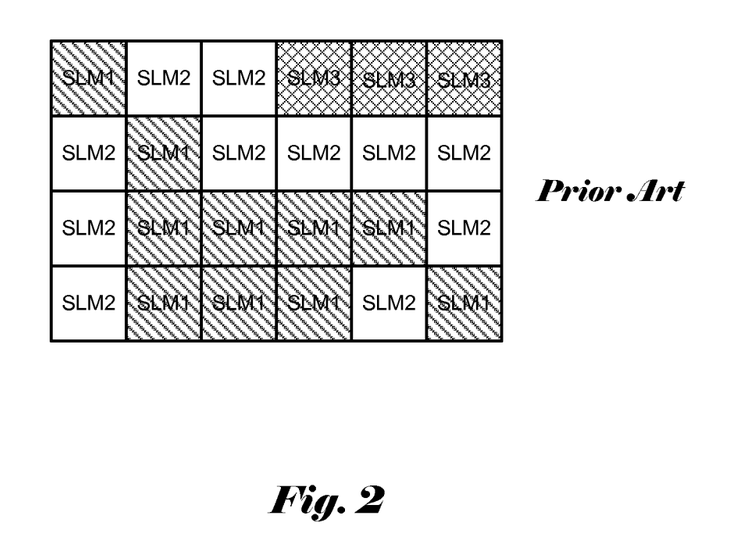
FIG. 2 illustrates an example of pixel based adaptive loop filter where Sum-modified Laplacian Measure (SLM) is used to classify the pixels in a 6×4 block into three categories.

The reconstructed data are processed by deblocking 170 and adaptive loop filtering 180 and are then stored in the picture buffer 140 as reference video data for processing of subsequent pictures. The original ALF proposed for HEVC is applied on a block by block basis. If ALF helps to improve the performance (lower distortion, lower bit rate, or better R-D performance), the ALF is turned on for the block. Otherwise, ALF is turned off for the block. An ALF scheme (called QC_ALF) was proposed by Qualcomm ("Video coding technology proposal by Qualcomm Inc.", Karczewicz et al., Joint Collaborative Team on Video Coding (JCT-VC) of ITU-T SG16 WP3 and ISO/IEC JTC1/SC29/WG11, 1st Meeting: Dresden, DE, 15-23 Apr., 2010, Document: JCTVC-A121. According to QC_ALF, the ALF is applied to the deblocked video data on a pixel by pixel basis. For each block, the Sum-modified Laplacian Measure (SLM) SLM(i,j) of each pixel (i,j) within the block is computed:

$$SLM(i, j) = \sum_{k=-K}^{L} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|,$$

where R(i,j) is the deblocked video data. The SLM is calculated based on (2K+1)×(2L+1) neighboring window centered at (i,j). The neighboring window size can be 9×9, 7×7, 5×5 or 3×3. In order to reduce the complexity, the 3×3 neighboring window has been used. The SLM value computed for each pixel of the block is used to classify the pixel into one of M groups. FIG. 2 illustrates an example of SLM classification where each square denotes a pixel. The pixels are classified into three groups according to the SLM value as shown in FIG. 2. The QC_ALF scheme selects a filter corresponding to each group to filter the pixels associated with the group.

The filter used for ALF is often horizontally and vertically symmetric in order to reduce computational complexity. To further reduce the complexity, diamond shaped filter may be used, particularly for large size filter. For example, 9×9, 7×7, or 5×5 diamond-shaped filter, or 5×5 or 3×3 square filter may be used. The SLM-based ALF is applied on a pixel by pixel basis and pixels may use different filters. Therefore, the QC_ALF is also referred to as pixel-adaptive or pixel-adaptation (PA) ALF. The SF ALF mentioned previously can be considered as a special case of PA ALF where only one group is used.

While the PA ALF can adaptively select a filter on a pixel by pixel basis, it requires deriving the group information based on the SLM for each pixel on the decoder side based because the required side information will be substantial if it is coded. Therefore, it is desirable to develop an ALF scheme that can achieve better performance and/or reduced complexity. Accordingly, a region based ALF scheme is disclosed herein. The ALF scheme according to the present invention applies ALF to deblocked video data on a region by region basis. The regions can be formed by dividing a picture or a picture area into fixed blocks or fixed sets of blocks. Alternatively, the regions can be formed by partitioning a picture or a picture area recursively. For example, quadtree may be used for recursive region partitioning. A flag in the syntax for ALF information set is used to indicate whether the region based ALF is applied or non-region based ALF method is applied. For example, a flag can be used to select between region-based ALF and block-based ALF. The filter selected for the block can be derived from a similar method used in the pixel-based ALF. For example, Chong et al, described a block based ALF, where Laplacian based activity metrics of 4×4 blocks are averaged so that each 4×4 block can use one Laplacian activity value (Chong et al., "CE8 Subtest 2: Block based adaptive loop filter (ALF)", Joint Collaborative Team on Video Coding (JCT-VC) of ITU-T SG16 WP3 and ISO/IEC JTC1/SC29/WG11, 5th Meeting: Geneva, C H, 16-23 Mar., 2011, Document: JCTVC-E323). This method requires computing the Laplacian activity value for each pixel of the 4×4 block and does not save any computation over the conventional pixel-based ALF. However, the block-based ALF can reduce the frequency of filter switching activity in comparison with the pixel-based ALF. Instead of using Laplacian activity as a classifier, other measurement, such as the band offset (BO) or the edge offset (EO) classifier used for sample adaptive offset (SAO), may also be used to replace the SLM computation used by Karczewicz et al. Both BO and EO require much fewer computations compared with the SLM measurement.

Figure 3:
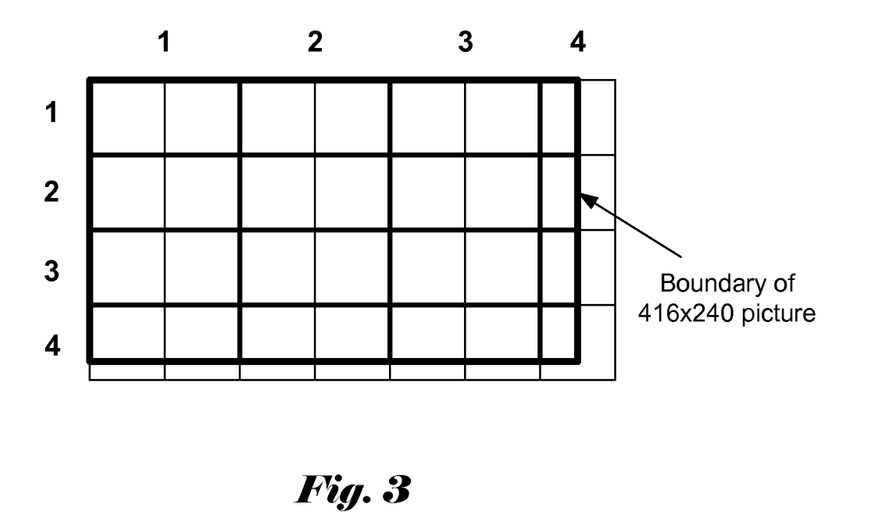
FIG. 3 illustrates an example of dividing a picture consisting of 416×240 pixels into 4×4 LCU-aligned regions, where each square is a LCU consisting of 64×64 pixels and a non-rightmost and non-bottom region consists of 2×1 LCUs.

As an example of region-based ALF using sets of blocks, a picture may be divided into 16 (i.e., 4×4) roughly-equal-sized regions. For example, the region widths of non-rightmost regions can be (PicWidth/4) wherein the PicWidth means the picture width. For rightmost regions, the region width can be (PicWidth−(PicWidth/4)*3). The region heights of non-bottom regions can be (PicHeight/4), wherein the PicHeight means the picture height. For bottom regions, the region height can be (PicHeight−(PicHeight/4)*3). In this example, the rightmost regions and the bottom regions may be larger than other regions. Another example is to partition a picture into 16 (i.e., 4×4) roughly-equal-sized LCU-aligned regions, wherein region boundaries must also be largest coding unit (LCU) boundaries, as shown in FIG. 3. The picture size is 416×240 and contains 7×4 LCUs, wherein each LCU has 64×64 pixels. The region widths of non-rightmost regions can be (((PicWidthInLCUs+1)/4)*64), wherein the PicWidthIn-LCUs means the number of LCUs of the picture width. The region heights of non-bottom regions can be (((PicHeightIn-LCUs+1)/4)*64), wherein the PicHeightInLCUs means the number of LCUs of the picture height. The size of the rightmost and bottom regions can be derived from PicWidth, PicHeight, and the size of a non-rightmost and non-bottom region. An index is assigned to each of 4×4 regions. While 4×4 regions are used as an example, it is understood that the present invention is not limited to the particular 4×4 regions.

In fact, M×N regions may be used to practice the present invention, where M and N are integers. For a picture having PicWidthInSamples pixels horizontally and PicHeightIn- Samples pixels vertically, the region index for a region with upper left corner coordinate (x,y) can be derived as follows. The (1<<Log 2MaxCUSize) is the maximum coding unit size, and xMaxIndex and yMaxIndex are the maximum region indexes in horizontal and vertical directions, respectively. The horizontal interval x_interval and the vertical interval y_interval of the region can be derived as:

$$x\_interval=((((PicWidthInSamples+(1<<Log\ 2Max\text{-}CUSize)-1)>>Log\ 2MaxCUSize)+x\_round)/(xMaxIndex+1)),\ and \quad (1)$$

$$y\_interval=((((PicHeightInSamples+(1<<Log\ 2Max\text{-}CUSize)-1)>>Log\ 2MaxCUSize)+y\_round)/(yMaxIndex+1)), \quad (2)$$

where $x\_round=\max(0,(xMaxIndex+1)/2-1)$ and $y\_round=\max(0,(yMaxIndex+1)/2-1)$.

The horizontal index x_idx and the vertical index y_idx can be derived as:

$$x\_idx=\min(xMaxIndex,x/(x\_interval<<Log\ 2MaxCUSize)),\ and \quad (3)$$

$$y\_idx=\min(yMaxIndex,y/(y\_interval<<Log\ 2MaxCUSize)) \quad (4)$$

The region index region_idx is determined according to:

$$region\_idx=y\_idx*(xMaxIndex+1)+x\_idx. \quad (5)$$

When the 4×4 regions are used for region based ALF, the region index can be derived as follows. The horizontal interval x_interval and the vertical interval y_interval of the region can be derived as:

$$x\_interval=((((PicWidthInSamples+(1<<Log\ 2Max\text{-}CUSize)-1)>>Log\ 2MaxCUSize)+1)>>2),\ and \quad (6)$$

$$y\_interval=((((PicHeightInSamples+(1<<Log\ 2Max\text{-}CUSize)-1)>>Log\ 2MaxCUSize)+1)>>2). \quad (7)$$

The horizontal index x_idx and the vertical index y_idx can be derived as:

$$x\_idx=\min(3,x/(x\_interval<<Log\ 2MaxCUSize)),\ and \quad (8)$$

$$y\_idx=\min(3,y/(y\_interval<<Log\ 2MaxCUSize)). \quad (9)$$

The region index region_idx is determined according to:

$$region\_idx=(y\_idx<<2)+x\_idx. \quad (10)$$

The filter index filter_idx(x,y) is determined according to:

$$filter\_idx(x,y)=region\_tab[region\_idx],$$

where region_tab [16]={0, 1, 4, 5, 15, 2, 3, 6, 14, 1, 10, 7, 13, 12, 9, 8}.

Figure 4:
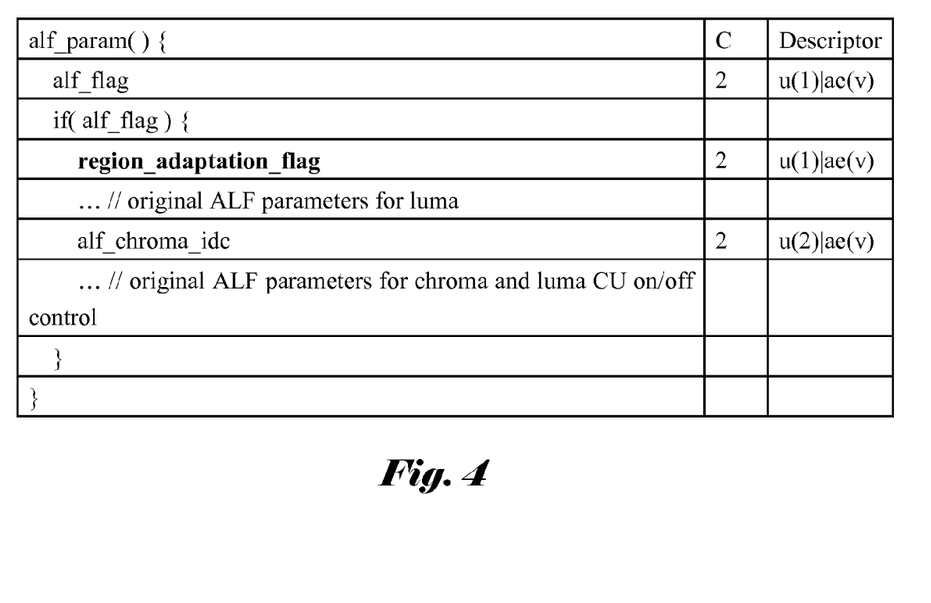
FIG. 4 illustrates an exemplary syntax design to support region based ALF incorporating a flag, region_adaptation_flag, to indicate whether region based ALF is used.

Two neighboring regions, i.e., regions with successive indices, can be merged. After region merging, one filter is applied to each merged region. The picture can then be processed by using the pixel-based ALF, the block-based ALF, or the region-based ALF. Compared to the pixel-based ALF and the block-based ALF, the region-based ALF can save computations associated with pixel-based classification of pixel adaptation and block-based classification of block adaptation, respectively, so that the average decoder complexity can be reduced when the region based ALF is incorporated. Furthermore, the region-based ALF also significantly reduces the number of filter switching in the picture and consequently results in less switching power. An example of syntax to support selection between region-based ALF and pixel-based ALF or between region-based ALF and block-based ALF is shown in FIG. 4. The only syntax change is to add one flag, region_adaptation_flag, in ALF parameter set, alf_param( ), of the slice header or the picture parameter set (PPS) to select between the pixel-based ALF and region-based ALF or between the block-based ALF and the region-based ALF.

Figure 5:
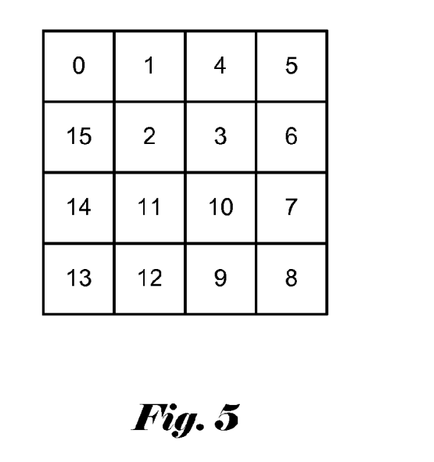
FIG. 5 illustrates the scanning order through the 4×4 regions according to the deformed Hilbert curve.
Figure 6:
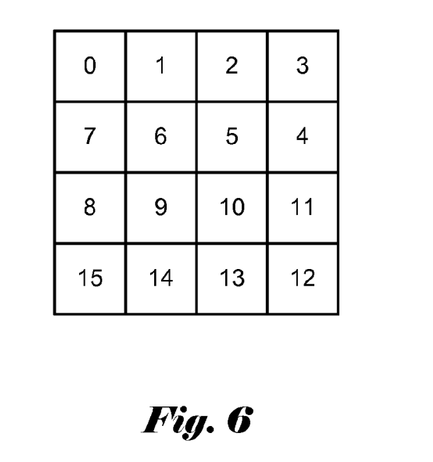
FIG. 6 illustrates the scanning order through the 4×4 regions according to the horizontal snake scan.
Figure 7:
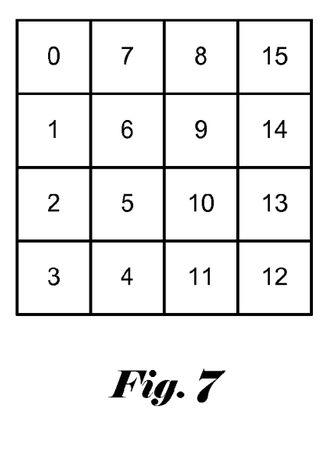
FIG. 7 illustrates the scanning order through the 4×4 regions according to the vertical snake scan.
Figure 8:
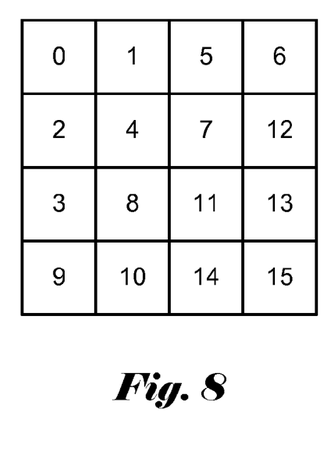
FIG. 8 illustrates the scanning order through the 4×4 regions according to the zig-zag scan.
Figure 9:
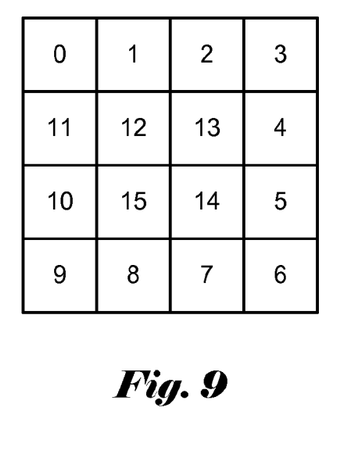
FIG. 9 illustrates the scanning order through the 4×4 regions according to the spiral scan.
Figure 10:
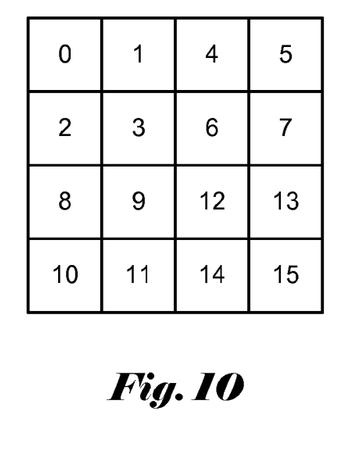
FIG. 10 illustrates the scanning order through the 4×4 regions according to the quad-tree scan.
Figure 11:
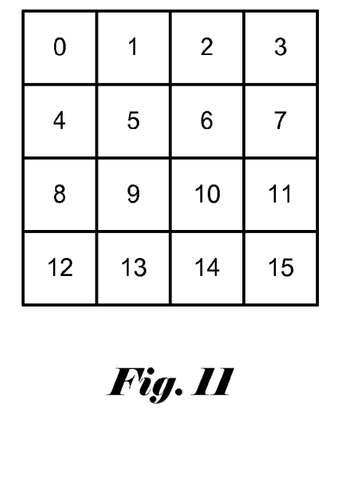
FIG. 11 illustrates the scanning order through the 4×4 regions according to the raster scan.

The coding efficiency may be further improved by region merging. Neighboring regions may have similar characteristics and can share a same filter to reduce information required for indicating the ALF filter. One method to perform region merging is to order the 2-D regions into 1-D regions. For example, the 4×4 regions can be converted into 1-D regions with group indexes from 0 through 15. The 2-D to 1-D conversion can be performed according to a specific scanning pattern. There are many known scan patterns that can be used to convert the 2-D regions into 1-D regions, such as deformed Hilbert curve (FIG. 5), horizontal snake san (FIG. 6), vertical snake scan (FIG. 7), zig-zag scan (FIG. 8), spiral scan (FIG. 9), quad-tree scan (FIG. 10) and raster scan (FIG. 11). Upon converting the 2-D regions into 1-D regions, neighboring regions, i.e., regions with consecutive group indexes can be merged to share a same filter as indicated by merging syntax. For example, one merge flag can be used to indicate whether the region with group index n is merged with the region with group index (n−1) or not.

Region merging can also be performed using 2-D merge syntax where a region may be merged with a surrounding region. Furthermore, a first flag can be used to indicate whether this region is merged or not first. The first flag is followed by one merge candidate flag if the first flag indicates that the region is merged. In certain circumstances, some of the surrounding regions may not available for merge candidates. For example, a region on the boundaries of a picture or on the boundaries of 4×4 regions will not have certain merge candidates. Accordingly, the merge candidate flag can be simplified based on the neighboring regions. For example, the merge candidate can be left or upper region and a 1-bit flag can be used as the merge candidate flag. However, if left and upper regions do not exist at the same time, then the merge candidate flag can be saved. Accordingly, the representation of the merge candidate flag is adapted to the availability of the neighboring regions. When some of the neighboring regions are not available, the merge candidate flag may be represented in fewer bits. The region merging can be adaptively applied to each set of 4×4 regions. A region merge enable flag may be used to indicate whether region merging is allowed for the 4×4 regions.

The region for ALF filtering can also be the filter unit (FU). A picture or a picture area can be recursively partitioned into smaller FUs if the split will result in better performance such as lower rate-distortion (R-D) cost. The R-D cost can be computed for one to-be-filtered region (an individual FU in this case) and for regions resulted from splitting. If splitting will result in lower R-D cost, the to-be-filtered region will be split; otherwise the region is not split. Alternatively, a picture or a picture area may be divided into smaller regions first. Neighboring regions can be merged if the merging will result in better performance such as lower R-D cost. If the cost for the merged region is smaller than the cost for individual regions, the regions will be merged; otherwise the regions will not be merged. According to a method embodying the present invention, several to-be-filtered regions can be merged into one FU to reduce the bitrate associated with the filter information.

Figure 12:
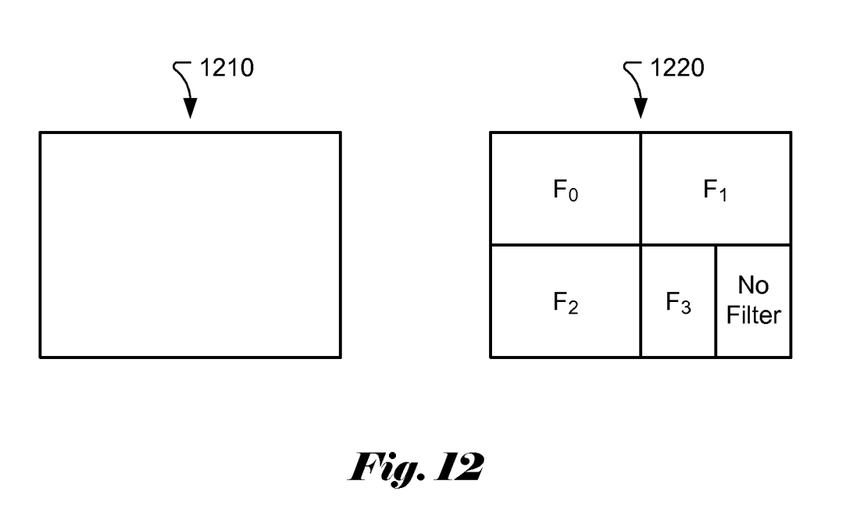
FIG. 12 illustrates an example of region splitting, where a region is split into five regions, i.e., $F_0$, $F_1$, $F_2$, $F_3$ and a No-Filter region.
Figure 13:
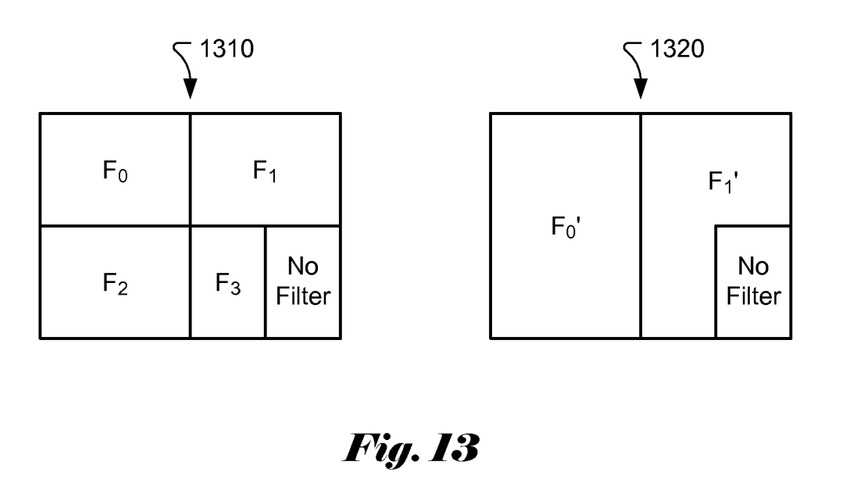
FIG. 13 illustrates an example where the five to-be-filtered regions are merged into three regions, $F_0'$, and $F_1'$ and a No-Filter region.

An example of region splitting is shown in FIG. 12 where a region (filter unit FU 1210) is split into five regions (FUs 1220), i.e., $F_0$, $F_1$, $F_2$, $F_3$ and a No-Filter region. The region split can be according to lower R-D cost. FIG. 13 illustrates an example of region merging according to one embodiment of the present invention. The to-be-filtered regions 1310 are considered for region merging according to the R-D cost. The R-D cost for individual neighboring regions is compared with the R-D cost of a merged region corresponding to these individual neighboring regions. The individual neighboring regions are merged if the merging results in lower R-D cost. The example of FIG. 13 illustrates a case where the five to-be-filtered regions 1310 are merged into three regions 1320, $F_0'$, and $F_1'$ and a No-Filter FU. Regions $F_0$ and $F_2$ are merged into $F_0'$, and Regions $F_1$ and $F_3$ are merged into $F_1'$.

Figure 14:
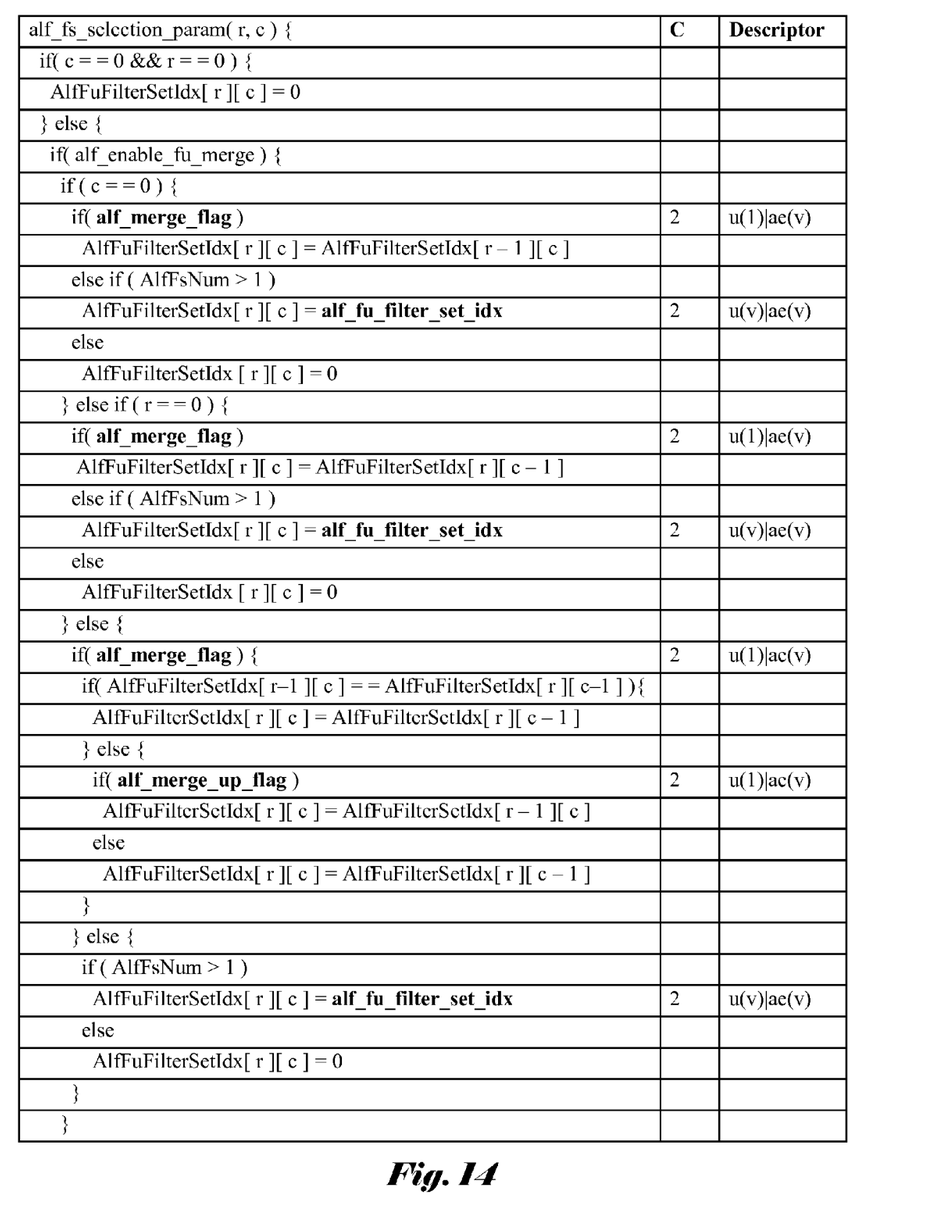
FIG. 14 illustrates an exemplary syntax design to support 2-D region merging.

An exemplary syntax design to support 2-D region merging is illustrated in FIG. 14. The alf_fs_selection_param(r, c) function processes filter sharing for region merging. The ALF merge flag, alf_merge_flag indicates whether the current region (i.e., FU in this example) is merged with another region, where a value 1 denotes that the current region is merged and a value 0 denotes that the current FU is not merged with the left or the upper region. The filter set index of the current region, alf_fu_filter_set_idx is incorporated when the current region is not merged. The first region of the picture always has the filter set index set to 0 and does not need to send the index. The syntax element alf_merge_up_flag indicates whether the region is merged with the region on the top side, where a value 0 denotes that the current region is merged with the left FU; a value 1 denotes that the current region is merged with the upper region.

Another aspect of the present invention is related to ALF filter design. Rate-distortion optimization (RDO) is a widely known technique used in video encoding to obtain good coding efficiency. RDO is usually applied during mode decision of macroblocks or sub-macroblocks or coding units, Intra prediction, motion estimation, adaptive loop filter (ALF) decision (for filter sizes, filter shapes, on/off switch, etc.), and sample adaptive offset (SAO) decision (for choosing different pixel classification methods). The best RDO decision is the one that minimizes a rate-distortion cost function, $J=D+\lambda R$, where D is the estimated distortion between original pixels and reconstructed (or predicted) pixels, R is the estimated rate required for sending the side information, and $\lambda$ is a Lagrange multiplier.

Rate-distortion-complexity optimization (RDCO) is also a well known technique widely used in video encoding to obtain a good trade-off between coding efficiency and coding complexity. RDCO is usually applied during mode decision of macroblocks, sub-macroblocks or coding units, Intra prediction, and motion estimation. The best RDCO decision is the one that minimizes a rate-distortion-complexity cost function, $J=D+\lambda_1 R+\lambda_2 C$, where D is the estimated distortion between original pixels and reconstructed (or predicted) pixels, R is the estimated rate required for sending the side information, C is the estimated complexity required for encoding or decoding (in terms of clock cycles, memory access, or other complexity measurement), and $\lambda_4$ and $\lambda_2$ are Lagrange multipliers.

An embodiment according to the present invention incorporates RDCO for ALF/SAO design, wherein the best candidate associated with a design feature to be determined according to the RDCO. The design feature may be mode decision or region partition. The mode decision among ALF different modes can be dependent on the slice type such as I/B/P-slices or the percentage of Inter/Intra coding units (CUs). Another embodiment according to the present invention incorporates RDCO for ALF filter selection. When the RDCO is used for ALF filter selection, the complexity of the RDCO can be associated with the number of filter coefficients. Alternatively, the RDCO can be used for ALF filter selection, where the complexity C of the RDCO can be associated with (A) the number of filter coefficients and (B) the number of pixels to be filtered, such as $C=A*B$. In yet another embodiment according to the present invention, the RDCO can be used for ALF filter selection, where the complexity C of the RDCO can be associated with (A) the number of filter coefficients, (B) the number of pixels to be filtered, and the number of required operations in one mode (TableOfNumOperations[Mode]), such as $C=A*B*$TableOfNumOperations [Mode].

In U.S. patent application, Ser. No. 13/158,427, filed on Jun. 12, 2011, entitled "Apparatus and Method of Sample Adaptive Offset for Video Coding", a sample adaptive offset (SAO) scheme is disclosed where each pixel is classified using multiple pixel classification types and each classification type may classify the pixel into multiple categories. According to the pixel classification type and the category of the pixel, an offset value is determined to compensate the offset. The SAO scheme utilizes either the band offset (BO) context or the edge offset (EO) context to classify pixels into categories. The complexity associated with the multiple pixel classification types may be different. Therefore, RDCO technique may be used for SAO decision to select a pixel classification type to achieve the best RDCO performance. Another aspect of the invention disclosed in U.S. patent application, Ser. No. 13/158,427 addresses the region partition. The RDCO technique can also be used for SAO decision to determine region partition. The cost for RDCO can be associated with the number of pixels to be processed and the number of required operations (TableOfNumOperations [Mode]) for the mode (i.e., the pixel classification type being considered).

The adaptive loop filter scheme described above can be used in a video encoder as well as in a video decoder. In both the video encoder and the video decoder, the reconstructed video data is subject to coding artifacts. The adaptive loop filter scheme described above can help to improve visual quality of the reconstructed video. Embodiments of an encoding system with region based ALF according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for processing of coded video using in-loop processing, the method comprising:
receiving reconstructed video data corresponding to coded video data from a processing unit, wherein the reconstructed video data is divided into regions, and wherein a merge syntax is used to indicate whether a current region shares a same in-loop filter of a neighboring region of the current region;
applying in-loop processing to the current region to generate a filtered region, wherein said applying in-loop processing uses the same in-loop filter of the neighboring region and the current region shares all parameters of the same in-loop filter of the neighboring region if the merge syntax indicates that the current region shares the same in-loop filter of the neighboring region, wherein the merge syntax comprises a 1-bit merge flag to indicate whether the current region shares the same in-loop filter of the neighboring region of the current region, wherein the regions are rectangular, the regions in a same row of a picture have a same height and the regions in a same column of the picture have a same width, wherein each of the regions not in top boundary and not in left boundary of the picture has exactly one left neighboring region and one upper neighboring region, the merge syntax further comprises a 1-bit merge candidate flag for the regions not in the top boundary and not in the left boundary of the picture to indicate whether the neighboring region merged is said exactly one left neighboring region or said exactly one upper neighboring region of the current region; and
providing the filtered region.

2. The method of claim 1, wherein each region boundary must be a largest coding unit (LCU) boundary or a picture boundary.

3. The method of claim 2, wherein each of the regions is assigned a group index according to a scanning pattern, wherein 1-D merge syntax is used to indicate that a first region with a first group index i is merged with a second region with a second group index (i−1).

4. The method of claim 3, wherein the scanning pattern is selected from a group consisting of deformation of Hilbert curve, horizontal snake scan, vertical snake scan, zig-zag scan, spiral scan, quad-tree scan, and raster scan.

5. The method of claim 1, wherein, for the regions in the top boundary or the left boundary of the picture, the 1-bit merge candidate flag is omitted and the neighboring region merged is inferred.

6. The method of claim 1, wherein a merge flag is used to indicate whether region merging is allowed or not.

7. The method of claim 1, wherein each region boundary between any two regions of the regions is a largest coding unit (LCU) boundary.

8. An apparatus for processing coded video using in-loop filtering, the apparatus comprising:
means for receiving reconstructed video data corresponding to coded video data from a processing unit, wherein the reconstructed video data is divided into regions, and wherein a merge syntax is used to indicate whether a current region shares a same in-loop filter of a neighboring region of the current region;
means for applying in-loop processing to the current region to generate a filtered region, wherein said applying in-loop processing uses the same in-loop filter of the neighboring region and the current region shares all parameters of the same in-loop filter of the neighboring region if the merge syntax indicates that the current region shares the same in-loop filter of the neighboring region, wherein the merge syntax comprises a 1-bit merge flag to indicate whether the current region shares the same in-loop filter of the neighboring region of the current region, wherein the regions are rectangular, the regions in a same row of a picture have a same height and the regions in a same column of the picture have a same width, wherein each of the regions not in top boundary and not in left boundary of the picture has exactly one left neighboring region and one upper neighboring region, the merge syntax further comprises a 1-bit merge candidate flag for the regions not in the top boundary and not in the left boundary of the picture to indicate whether the neighboring region merged is said exactly one left neighboring region or said exactly one upper neighboring region of the current region; and
means for providing the filtered region.

9. The apparatus of claim 8, wherein each region boundary must be a largest coding unit (LCU) boundary or a picture boundary.

10. The apparatus of claim 9, wherein each of the regions is assigned a group index according to a scanning pattern, wherein 1-D merge syntax is used to indicate a first region with a first group index i is merged with a second region with a second group index (i−1).

11. The apparatus of claim 8, wherein the merge syntax comprises a 1-bit merge flag to indicate whether the current region shares the same in-loop filter of the neighboring region of the current region.

12. The apparatus of claim 9, wherein a merge flag is used to indicate whether region merging is allowed or not.

13. The apparatus of claim 9, wherein each region boundary between any two regions of the regions is a largest coding unit (LCU) boundary.

* * * * *